United States Patent [19]

Ito

[11] Patent Number: 4,584,573
[45] Date of Patent: Apr. 22, 1986

[54] COMBINED CHARACTER AND BACKGROUND PATTERN PRINT CONTROL SYSTEM

[75] Inventor: Matsutaka Ito, Yamatokoriyama, Japan

[73] Assignee: Sharp Kabushiki Kaisha, Osaka, Japan

[21] Appl. No.: 396,267

[22] Filed: Jul. 8, 1982

[30] Foreign Application Priority Data

Jul. 20, 1981 [JP] Japan ................................. 56-114547
Jul. 20, 1981 [JP] Japan ................................. 56-114548
Jul. 23, 1981 [JP] Japan ................................. 56-116881

[51] Int. Cl.⁴ ........................... G09G 1/06; G09G 1/14
[52] U.S. Cl. ..................................... 340/734; 340/745; 340/721; 346/75
[58] Field of Search ................... 340/734, 721, 745; 346/75, 108, 160

[56] References Cited

U.S. PATENT DOCUMENTS

3,566,361  2/1971  Lavertu ........................... 340/734 X
4,115,788  9/1978  Takano et al. ..................... 346/75
4,128,834  12/1978  Katagi ............................. 340/734 X
4,291,305  9/1981  Kimura et al. ..................... 340/734
4,295,135  10/1981  Sukonick ......................... 340/721 X
4,317,114  2/1982  Walker ............................ 340/734 X
4,398,171  8/1983  Dahan et al. ..................... 340/734 X Primary Examiner—Marshall M. Curtis
Assistant Examiner—Vincent P. Kovalick
Attorney, Agent, or Firm—Birch, Stewart, Kolasch & Birch

[57]  ABSTRACT

A print control system for a word processing apparatus includes a character pattern data generation circuit and a background pattern data generation circuit. The character pattern data developed from the character pattern data generation circuit and the background pattern data developed from the background pattern data generation circuit are combined at an OR gate. A composite data signal developed from the OR gate is applied to a dot matrix printer, whereby the character pattern is superimposed on the background pattern in order to ornamentally emphasize the character pattern.

11 Claims, 12 Drawing Figures

COMPOSITE PRINTING

COMPOSITE PRINTING

COMPOSITE PRINTING

FIG. 11

SPACED PRINTING

SPACED PRINTING

FIG. 12

COMBINED CHARACTER AND BACKGROUND PATTERN PRINT CONTROL SYSTEM

BACKGROUND AND SUMMARY OF THE INVENTION

The present invention relates to a word processing apparatus and, more particularly, to a print control system in a word processing apparatus.

An object of the present invention is to provide a print control system which controls a printing operation of a background pattern in addition to the printing of character patterns.

Another object of the present invention is to provide a control system for providing various background patterns in response to a selection operation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modification within the spirit and scope of the invention will become apparent to those skilled in the art from this detailed description.

The print control system of the present invention is particularly suited for a Japanese language word processing apparatus which includes a dot matrix printer such as an ink jet system printer. In such an ink jet system printer, one character pattern is formed by, for example, a matrix pattern comprising 24×24 dot positions. Desired dot positions are selected to form a character pattern. Additional desired dot positions can be selected to form a background pattern which functions to ornamentally stress the characters printed thereon.

In accordance with an embodiment of the present invention, a character pattern generator is provided for developing a character print data signal for printing a character in a dot matrix fashion. A background pattern generation system is provided for developing a background pattern data signal which controls the formation of the background pattern. The character print data signal and the background pattern data signal are combined through the use of a composition circuit which includes an OR gate, and the composite data signal is applied to a dot matrix printer such as an ink jet system printer.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
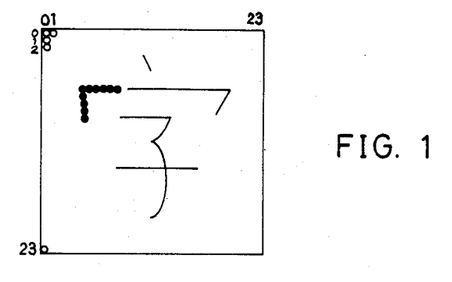
FIG. 1 is a schematic plan view showing an example of a dot matrix character pattern formed by an embodiment of a print control system of the present invention.

FIG. 1 shows an example of a Chinese character printout produced by a Japanese language word processing apparatus which includes a dot matrix printer associated with the print control system of the present invention. Generally, the dot matrix printer such as an ink jet system printer forms one character pattern through the use of a matrix of 24×24 dot positions. The scanning is started from the 0-th dot in the 0-th column toward the 23rd dot in the 0-th column, and ends at the 23rd dot in the 23rd column.

Figure 2:
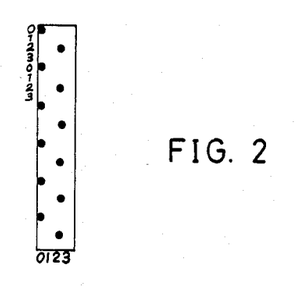
FIG. 2 is a schematic plan view showing a unit of an example of a dot matrix background pattern formed by an embodiment of a print control system of the present invention.

FIG. 2 shows an example of a unit area matrix of a background pattern formed by the print control system of the present invention. The unit area of the background pattern comprises a matrix of 24×4 dot positions. The example shown in FIG. 2 includes a sub-unit comprising 4×4 dot positions. In the sub-unit of 4×4 dot matrix, the print operation is conducted to the 0-th dot position in the 0-th column and the second dot position in the second column. Six (6) sub-units are repeated in the vertical direction to form the unit matrix of the background pattern. The thus formed unit matrix (24×4) of the background pattern is repeated in the horizontal direction by a desired length. The printer head is driven to travel in the horizontal direction in an ink jet system printer of the charge amplitude controlling type, and the deflection of the ink droplets is conducted in the vertical direction.

Figure 3:
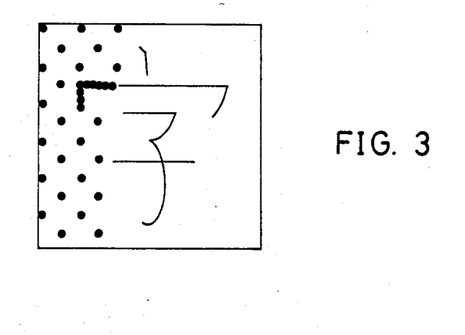
FIG. 3 is a schematic plan view showing a combined print pattern which is a composite of the patterns shown in FIGS. 1 and 2.

The thus formed background pattern shown in FIG. 2 is combined with the character pattern shown in FIG. 1 in a manner as shown in FIG. 3. The background pattern functions to ornamentally emphasize the character printed thereon.

Figure 4:
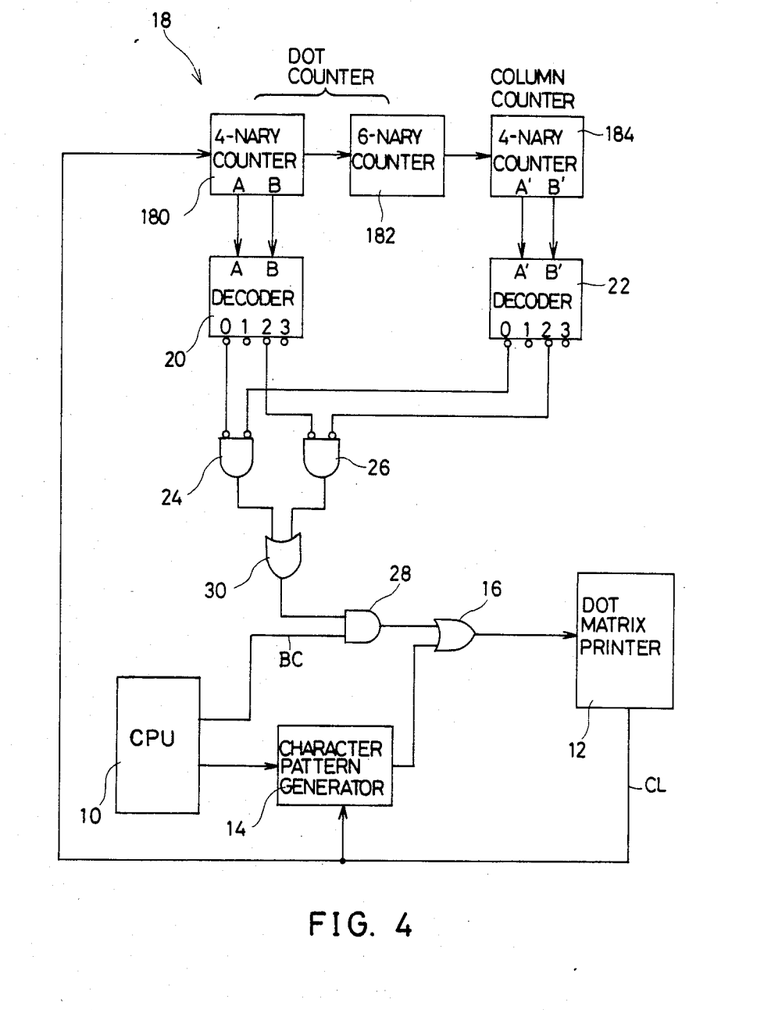
FIG. 4 is a block diagram of an embodiment of a print control system of the present invention.

FIG. 4 shows an embodiment of a print control system of the present invention for generating the combined character and background pattern as shown in FIG. 3.

The operation of the print control system of the present invention is controlled by a central processor unit 10 which is preferably made of a CPU Z-8000 manufactured by Sharp Corporation. The actual printing operation is conducted by a dot matrix printer 12 such as an ink jet system printer of the charge amplitude controlling type. The central processor unit 10 develops a character code signal which is applied to a character pattern generator 14. The character pattern generator 14 develops a character pattern signal in response to a clock signal CL developed from the dot matrix printer 12. The thus developed character pattern signal is applied to the dot matrix printer 12 via an OR gate 16.

The clock signal CL is further applied to a counter system 18 for generating a background pattern signal. The counter system 18 includes a dot counter comprising 4 bit binary or a 4-nary counter 180 and a 6 bit binary or 6-nary counter 182, and a column counter comprising a 4-nary counter 184. The clock signal CL is applied to the 4-nary counter 180. The 4-nary counter 180 and the 6-nary counter 182 function, in combination, to count the twenty-four (24) dots in one column. A clock output signal of the 6-nary counter 182 is applied to the 4-nary counter 184 which functions to count four (4) columns.

A two bit output signal derived from the 4-nary counter 180 is applied to a decoder 20. The decoder 20 includes four (4) output terminals "0", "1", "2" and "3". The output signal at the output terminal "0" bears the logic "H" when the count contents stored in the 4-nary counter 180 correspond to the 0-th dot position, 4-th dot position, 8-th dot position, 12-th dot position, 16-th dot position and 20-th dot position in the dot matrix shown in FIG. 1. The output signal at the output terminal "2" of the decoder 20 bears the logic "H" when the count contents stored in the 4-nary counter 180 correspond to the 2nd dot position, 6-th dot position, 10-th dot position, 14-th dot position, 18-th dot position and 22nd dot position in the dot matrix shown in FIG. 1.

A two bit output signal developed from the 4-nary counter 184 is applied to another decoder 22. The decoder 22 includes four (4) output terminals "0", "1", "2" and "3". The output signal at the output terminal "0" bears the logic "H" when the count contents stored in the 4-nary counter 184 correspond to the 0-th column, 4-th column, 8-th column, - - - -, in the dot matrix shown in FIG. 1. The output signal at the output terminal "2" of the decoder 22 bears the logic "H" when the count contents stored in the 4-nary counter 184 correspond to the 2nd column, 6-th column, 10-th column, - - - -, in the dot matrix shown in FIG. 1. The decoders 20 and 22 are preferably made of SN-74 LS-139 chips manufactured by Texas Instruments Incorporated.

The output terminal "0" of the decoder 20 and the output terminal "0" of the decoder 22 are connected to an AND gate 24. The output terminals "2" of the decoders 20 and 22 are connected to another AND gate 26. Output signals of the AND gates 24 and 26 are applied to one input terminal of an AND gate 28 via an OR gate 30. The AND gate 28 is made conductive when the background pattern is desired to be printed. More specifically, when the background pattern is desired to be printed, the central processor unit 10 develops a background control signal BC which is applied to the other input terminal of the AND gate 28. The output signal of the AND gate 28 is applied to the OR gate 16 which functions to combine the character pattern data derived from the character pattern generator 14 with the background pattern data derived from the AND gate 28.

An operational mode of the print control system of FIG. 4 is as follows. In the normal character print mode, the central processor unit 10 does not develop the background control signal BC and, therefore, the AND gate 28 is held in the off state. The character code is developed from the central processor unit 10, and the character pattern data is developed from the character pattern generator 14. The character pattern data is applied to the dot matrix printer 12 via the OR gate 16. The dot matrix printer 12 performs the character printing operation as is well known in the art.

When the background pattern is desired to be printed, the central processor unit 10 develops the background control signal BC which functions to enable the AND gate 28. As in the case of the normal character print mode, the character pattern data is developed from the character pattern generator 14. The generation of the character pattern data is synchronized with the development of the clock signal CL. The clock signal CL is applied to the 4-nary counter 180 to conduct the counting operation of the counter system 18. Thus, the decoders 20 and 22 develop the output signals for effecting the printing operation onto the (0,0) position and the (2,2) position in the matrix pattern of FIG. 2. The thus developed background pattern data is applied to the OR gate 16 via the OR gate 30 and the AND gate 28. Accordingly, the print data developed from the OR gate 16 is a composite data of the character pattern data and the background pattern data. The printing operation is conducted in a manner as shown in FIG. 3.

Figure 5:
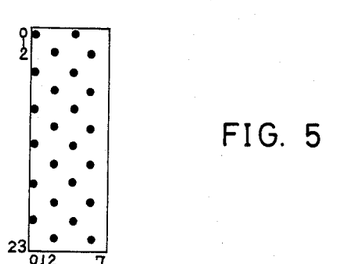
FIG. 5 is a schematic plan view showing a unit area of an example of a dot matrix background pattern formed by another embodiment of a print control system of the present invention.

In the print control system of FIG. 4, the background pattern is fixed. In another embodiment of the present invention, a desired background pattern is selected by the operator. In this embodiment, the unit area of the background pattern is formed of 24×8 dot positions as shown in FIG. 5. The sub-unit area comprises 4×4 dot positions as in the case of the unit pattern of FIG. 2.

Figure 6:
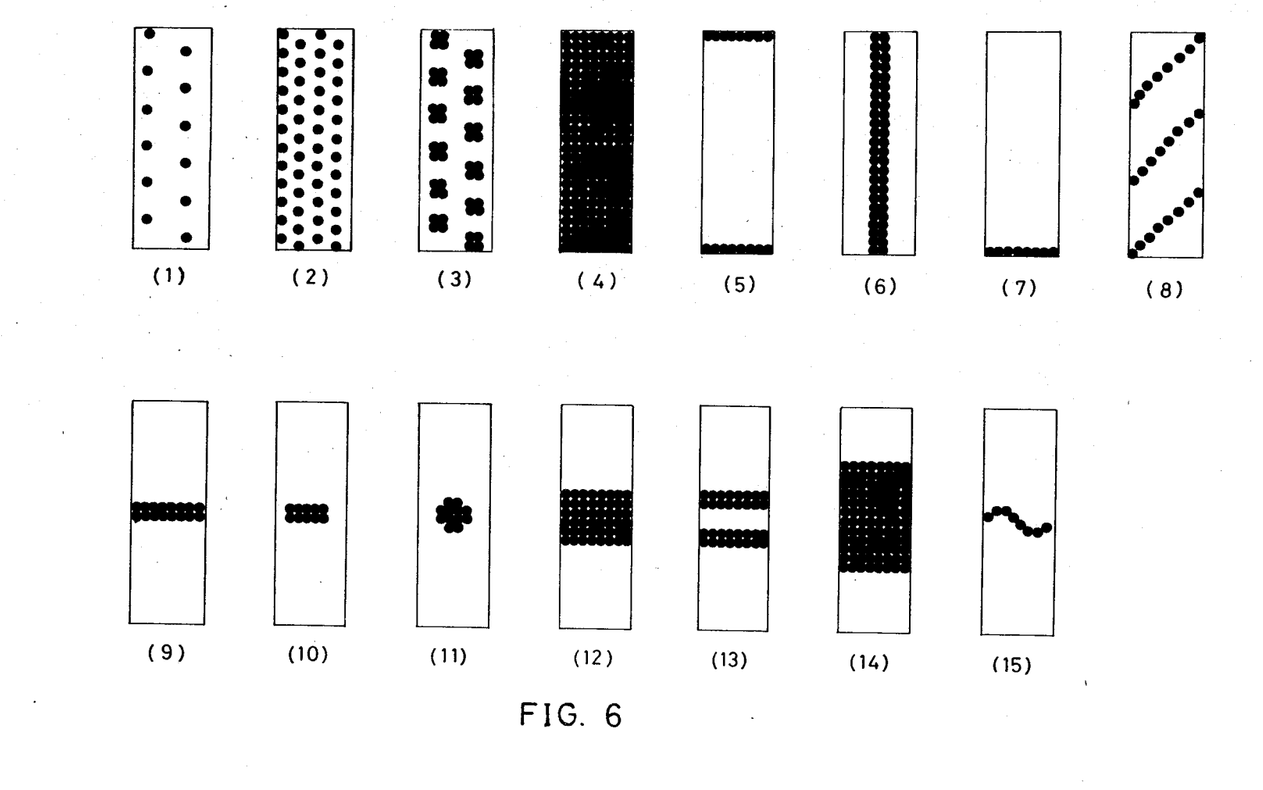
FIG. 6 is a schematic plan view showing various types of dot matrix background patterns formed by another embodiment of a print control system of the present invention.

FIG. 6 shows various units of the background pattern which can be produced by the print control system of the present invention.

Figure 7:
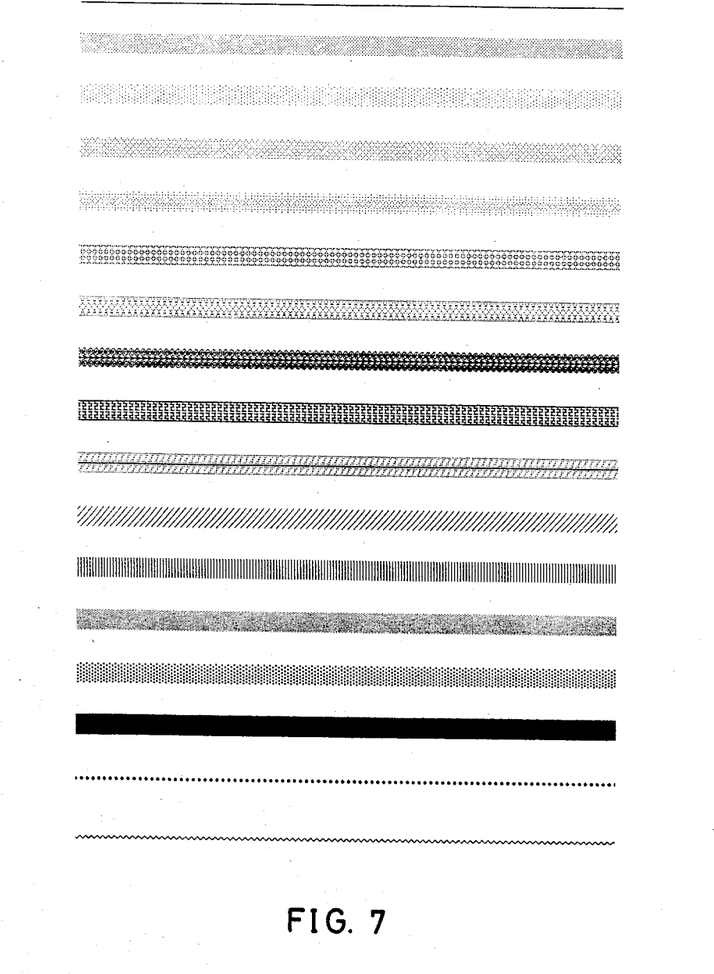
FIG. 7 is a plan view of examples of dot matrix background patterns formed by another embodiment of a print control system of the present invention.

FIG. 7 shows examples of the background pattern printed by the dot matrix printer 12 of the present invention.

Figure 8:
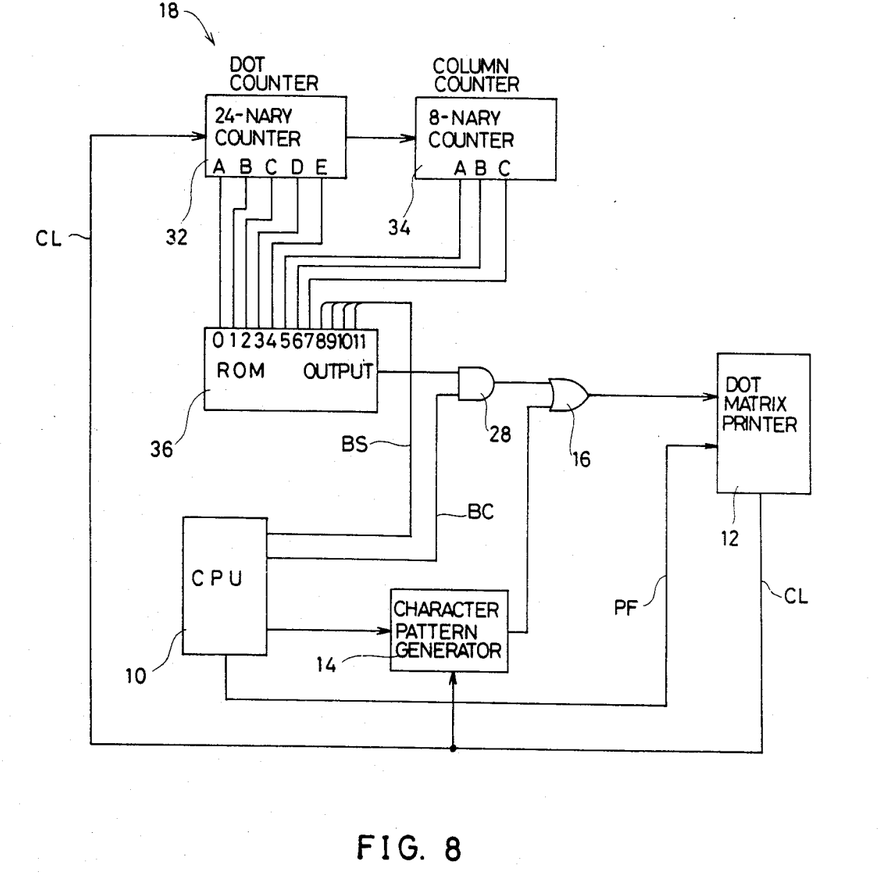
FIG. 8 is a block diagram of another embodiment of a print control system of the present invention.

FIG. 8 shows another embodiment of a print control system of the present invention, wherein a desired background pattern is selected at the operator's choice. Like elements corresponding to those of FIG. 4 are indicated by like numerals.

The counter system 18 includes a 24 bit binary or 24-nary counter 32 for counting twenty-four (24) dots in one column, and an 8 bit binary or 8-nary counter 34 for counting 0-th through 7-th columns. A read only memory 36 is provided for developing background pattern data in order to produce various background patterns shown in FIGS. 6 and 7. The output data signal developed from the read only memory 36 is applied to the OR gate 16 via the AND gate 28. The read only memory 36 is preferably a PROM TMS-2532 chip manufactured by Texas Instruments Incorporated.

The address input terminals "0" through "4" of the read only memory 36 are connected to receive the output signals developed from the output terminals "A" through "E" of the 24-nary counter 18. The address input terminals "5" through "7" of the read only memory 36 are connected to receive the output signals developed from the output terminals "A" through "C" of the 8-nary counter 34. The read only memory 36 further includes four selection input terminals "8" through "11" which receive a background pattern selection signal BS developed from the central processor unit 10.

The normal character printing operation is conducted in the same manner as the embodiment of FIG. 4. The central processor unit 10 develops a paper feed control signal PF for advancing the recording paper in the vertical direction.

In the background pattern formation mode, a desired background pattern is selected by the operator through the use of, for example, a key input panel. In response to the selection operation, the central processor unit 10 develops the background pattern selection signal BS which is applied to the selection input terminals "8" through "11" of the read only memory 36. The central processor unit 10 further develops the background control signal BC for enabling the AND gate 28. The character pattern generator 14 develops character pattern data in synchronization with the clock signal CL which is developed from the dot matrix printer 12. The clock signal CL is further applied to the 24-nary counter 32 for activating the counter system 18.

In this way, the address input signal is applied to the input terminals "0" through "11" of the read only memory 36 which develops the background pattern data to be applied to the OR gate 16 via the AND gate 28. At the OR gate 16, the background pattern data developed from the read only memory 36 is combined with the character pattern data developed from the character pattern generator 14, and the composite data is applied to the dot matrix printer 12. The composite printing is schematically shown in FIG. 3. FIG. 7 shows examples of the background pattern which may be formed by developing background pattern data from the read only memory 36 while the space code is continuously developed from the character pattern generator 14.

Figure 9:
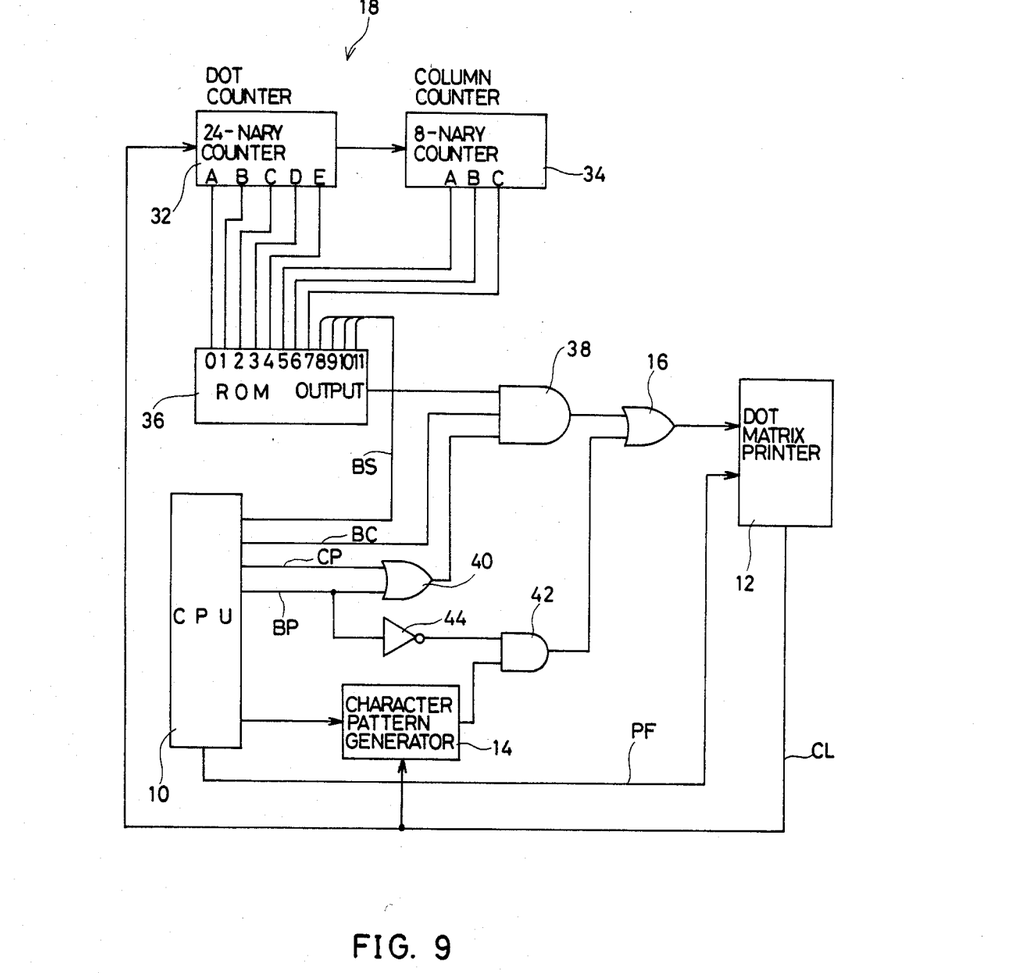
FIG. 9 is a block diagram of still another embodiment of a print control system of the present invention.

In the foregoing embodiments, the background pattern and the character pattern are superimposed on each other. FIG. 9 shows still another embodiment of the print control system of the present invention, wherein the background pattern is formed at a position spaced from the character pattern by a preselected length in the vertical direction. Like elements corresponding to those of FIG. 8 are indicated by like numerals.

The background pattern data developed from the read only memory 36 is applied to an AND gate 38 which is placed in a conductive condition when the background pattern is desired to be produced. The AND gate 38 receives the background control signal BC developed from the central processor unit 10 and an output signal of an OR gate 40. The output signal of the AND gate 38 is applied to the OR gate 16 where the background pattern data is combined with the character pattern data, and the composite signal is applied to the dot matrix printer 12.

The central processor unit 10 develops a composite print instruction signal CP when the character pattern and the background pattern are desired to be superimposed on each other. The central processor unit 10 further develops a background print instruction signal BP when the background pattern is desired to be printed at a position spaced apart from the character pattern by a preselected length in the vertical direction. More specifically, the background print instruction signal BP is developed when a distance data is introduced into the central processor unit 10, the distance data determining the preselected length provided between the character pattern and the background pattern.

The composite print instruction signal CP and the background print instruction signal BP are applied to the AND gate 38 via the OR gate 40. Furthermore, the background print instruction signal BP is applied to one input terminal of an AND gate 42 via an inverter 44.

The other input terminal of the AND gate 42 is connected to receive the character pattern data developed from the character pattern generator 14. The output signal of the AND gate 42 is applied to the OR gate 16. The central processor unit 10 develops the paper feed control signal PF in response to the distance data applied thereto.

Operational modes of the print control system of FIG. 9 will be described with reference to FIG. 10.

(1) NORMAL CHARACTER PRINTING MODE

In the normal character printing mode, the background control signal BC is not developed. Accordingly, the AND gate 38 is held in the off state so that the background pattern data is not applied to the dot matrix printer 12. Neither the composite print instruction signal CP nor the background print instruction signal BP is developed from the central processor unit 10. Thus, the AND gate 42 is placed in the conductive condition. The character pattern data developed from the character pattern generator 14 is applied to the dot matrix printer 12 via the AND gate 42 and the OR gate 16.

(2) COMPOSITE PRINTING MODE

Figure 11:
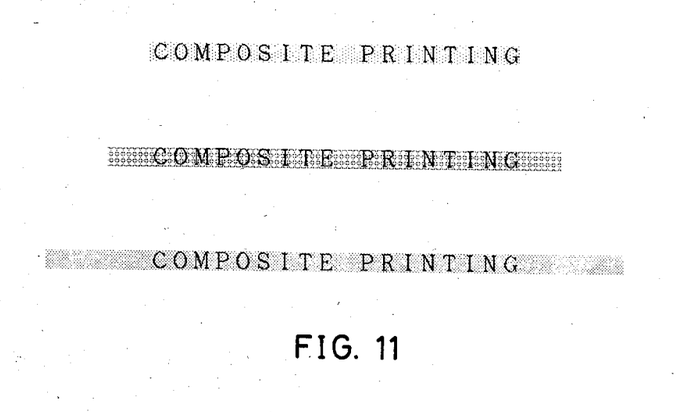
FIG. 11 is a plan view of an example of an actual printout pattern formed by the print control system of FIG. 9.

In the composite printing mode, the character pattern and the background pattern are superimposed on each other as shown in FIG. 11. In other words, the distance data is "0" in the composite printing mode.

Figure 10:
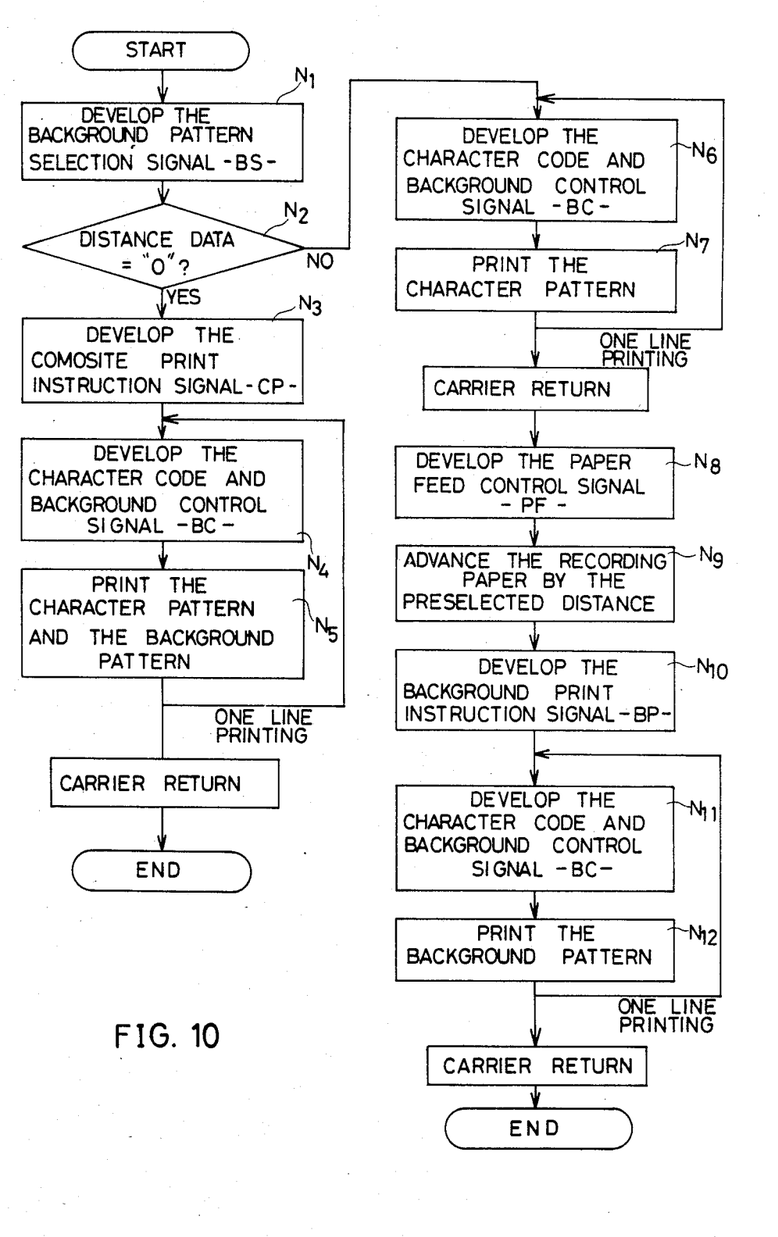
FIG. 10 is a flow chart for explaining an operational mode of the print control system of FIG. 9.

At the step $N_1$ shown in the flow chart of FIG. 10, the central processor unit 10 develops the background pattern selection signal BS for selecting a desired background pattern stored in the read only memory 36. At the step $N_2$ the determination is conducted as to whether the distance data is "0". More specifically, the determination is conducted as to whether the composite printing is desired to be performed. If the distance data "0" is detected at the step $N_2$, the program is advanced to the following step $N_3$. The composite print instruction signal CP is developed from the central processor unit 10 and, then, the character code is applied to the character pattern generator 14 and the background control signal BC is applied to the AND gate 38 at the step $N_4$. Since the background control signal BC and the composite print instruction signal CP are developed from the central processor unit 10, the AND gate 38 transfers the background pattern data developed from the read only memory 36 toward the OR gate 16. The AND gate 42 transfers the character pattern data developed from the character pattern generator 14 toward the OR gate 16 because the background print instruction signal BP is not developed from the central processor unit 10.

Under these conditions, the character pattern generator 14 develops the character pattern data in response to the clock signal CL developed from the dot matrix printer 12. The counter system 18 performs the counting operation in response to the clock signal CL developed from the dot matrix printer 12. Accordingly, the background pattern data is developed from the read only memory 36 in response to the clock signal CL developed from the dot matrix printer 12. The thus developed character pattern data and the background pattern data are combined with each other at the OR gate 16 and, then, applied to the dot matrix printer 12 (step $N_5$).

(3) SPACED PRINTING MODE

Figure 12:
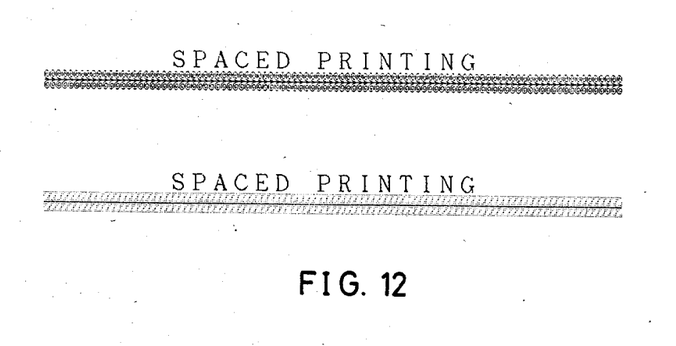
FIG. 12 is a plan view of another example of an actual printout pattern formed by the print control system of FIG. 9.

In the spaced printing mode, the background pattern is spaced apart from the character pattern by a preselected distance as shown in FIG. 12.

At the step $N_1$ shown in the flow chart of FIG. 10, the central processor unit 10 develops the background pattern selection signal BS for selecting a desired background pattern stored in the read only memory 36. At the following step $N_2$, a specific distance data other than "0" is detected and, therefore, the program is advanced to a step $N_6$ where the character code is developed from the central processor unit 10 toward the character pattern generator 14 and the background control signal BC is applied from the central processor unit 10 to the AND gate 38. At this moment, neither the composite print instruction signal CP nor the background print instruction signal BP is developed from the central processor unit 10 and, therefore, the AND gate 38 is placed in the nonconductive condition and the AND gate 42 is placed in the conductive condition. Accordingly, only the character pattern data is applied to the OR gate 16 to print the character pattern through the use of the dot matrix printer 12 (step $N_7$).

When the printing operation of the character pattern of one line is completed, the program is advanced to the following step $N_8$ to develop the paper feed control signal PF. At the step $N_9$ the recording paper is advanced in the vertical direction by the preselected length determined by the distance data which is detected at the step $N_2$. Then, the background print instruction signal BP is developed from the central processor unit 10 at the step $N_{10}$. In response to the development of the background print instruction signal BP, the AND gate 42 is made nonconductive and the AND gate 38 is placed in the conductive condition. Accordingly, only the background pattern data is applied from the AND gate 38 to the OR gate 16 when the print start command is developed. The background pattern is printed on the recording paper at a position spaced apart from the character pattern by the preselected distance as shown in FIG. 12 (steps $N_{11}$ and $N_{12}$).

The invention being thus described, it will be obvious that the same may be varied in many ways. Such variations are not to be regarded as a departure from the spirit and scope of the invention, and all such modifications are intended to be included within the scope of the following claims.

What is claimed is:

1. A print control system for a dot matrix printer comprising:
    character pattern signal generation means for developing a character pattern data signal associated with an individual character to be printed at a desired location in response to each character code signal applied thereto;
    background pattern signal generation means for developing a background pattern data signal indicative of a desired background pattern;
    combining means for combining said character pattern data signal developed from said character pattern signal generation means with said background pattern data signal developed from said background pattern signal generation means to produce an output signal corresponding to the desired background pattern and character to be printed at said desired location;
    drive means responsive to said combining means, for applying the output signal of said combining means to said dot matrix printer, to print said character and desired background pattern at said desired location; and
    means for shifting said printer to a new location of the next individual character to be printed in response to the completion of the printing of said character and desired background by said drive means the shifting of said printer to the new location of the next individual character enabling said character pattern signal generation means and background pattern signal generation means to develop a new character code signal and background pattern data signal for combining by said combining means to produce a new output signal applied to said drive means.

2. The print control system of claim 1, wherein said combining means comprises an OR gate.

3. The print control system of claim 1, further comprising:
    first inhibition means disposed between said background pattern signal generation means and said combining means for selectively applying said background pattern data signal developed from said background pattern signal generation means to said combining means.

4. The print control system of claim 1, 2 or 3, wherein said background pattern signal generation means comprises:
    read only memory means for storing background pattern data of plural kinds of background patterns; and
    selection means for selecting a desired background pattern stored in said read only memory means.

5. The print control system of claim 3, further comprising:
    second inhibition means disposed between said character pattern signal generation means and said combining means for selectively applying said character pattern data signal developed from said character pattern signal generation means to said combining means.

6. The print control system of claim 1, 2, 3 or 5, wherein said dot matrix printer comprises an ink jet system printer of the charge amplitude controlling type.

7. A print control system for a dot matrix printer comprising:
    character pattern signal generating means for developing a character pattern data signal associated with an individual character to be printed at a desired location, each said character pattern signal being indicative of the presence or absence of dots at positions in a character development area;
    dot position address development means for producing dot position addresses indicative of particular dot positions in said character development area;
    background pattern signal generating means for developing a background pattern signal indicative of a desired background pattern upon application of dot position addresses thereto;
    combining means for combining said character pattern data signal developed from said character pattern signal generating means with said background pattern signal developed by said background pattern signal generating means to produce an output signal corresponding to the desired background pattern and character to be printed at said desired location;

drive means, responsive to said combining means, for applying said output signal to said dot matrix printer to print said character and desired background pattern at said desired location; and means, responsive to completion of said character by said printer, for addressing a new character development area to enable printing of both or either of a character and background at said new character development area.

8. The print control system of claim 7 wherein said background pattern signal generating means includes a read only memory for storing pattern information used to develop said background pattern signal upon addressing said memory using said dot position address.

9. The print control system of claim 7 further comprising:

pattern selection means enabling selection of said desired background pattern from a plurality of possible patterns and producing a background pattern selection signal indicative thereof;

said read only memory storing pattern information represensative of each possible pattern therein, said background pattern selection signal being applied to said read only memory as an address thereof to select the memory locations storing the pattern information indicative of said desired background pattern.

10. The print control system of claim 5 further comprising control means for controlling the operation of said first and second inhibition means, said control means disabling said first and second inhibition means when composite printing is desired and disabling only said second inhibition means when character printing without background information is desired.

11. The print wheel of claim 10 wherein said control means further controls said first and second inhibition means by alternately disabling said first and second inhibition means, print line by print line, to interleave said characters and background.

* * * * *